(12) United States Patent
Finkelshtein et al.

(10) Patent No.: US 12,273,380 B2
(45) Date of Patent: Apr. 8, 2025

(54) AI-SUPPORTED NETWORK TELEMETRY USING DATA PROCESSING UNIT

(71) Applicant: Mellanox Technologies LTD., Yokneam (IL)

(72) Inventors: Dotan Finkelshtein, Yokneam (IL); Alexander Bilkovskii, Tel Aviv (IL); Roni Bar Yanai, Even Yehuda (IL); Juan Jose Vegas Olmos, Solrød Strand (DK)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 432 days.

(21) Appl. No.: 17/550,867

(22) Filed: Dec. 14, 2021

(65) Prior Publication Data

US 2023/0188561 A1    Jun. 15, 2023

(51) Int. Cl.
*H04L 9/40*       (2022.01)
*G06N 20/00*   (2019.01)
*H04L 69/22*   (2022.01)

(52) U.S. Cl.
CPC ........ *H04L 63/1466* (2013.01); *G06N 20/00* (2019.01); *H04L 63/0245* (2013.01); *H04L 63/1416* (2013.01); *H04L 63/1425* (2013.01); *H04L 63/166* (2013.01); *H04L 63/20* (2013.01); *H04L 69/22* (2013.01)

(58) Field of Classification Search
CPC ............. H04L 63/1416; H04L 63/1441; H04L 63/1408; H04L 63/0245; H04L 63/20; H04L 69/22; H04L 63/1425; H04L 63/166; H04L 63/1466; H04L 63/1458; H04L 63/145; H04L 63/1483; G06N 20/00

USPC .......................................................... 726/22
See application file for complete search history.

(56) References Cited

U.S. PATENT DOCUMENTS

| | | | |
|---|---|---|---|
| 10,931,696 B2* | 2/2021 | Kuppanna | H04L 63/0227 |
| 11,588,731 B1* | 2/2023 | Teng | H04L 61/2514 |
| 11,611,532 B1* | 3/2023 | Haefner | H04L 63/1425 |
| 11,683,343 B2* | 6/2023 | Lyon | G06F 9/453 726/23 |
| 2017/0279685 A1 | 9/2017 | Mota et al. | |
| 2019/0245873 A1 | 8/2019 | Wu et al. | |
| 2023/0086547 A1* | 3/2023 | Hickey | G06F 16/13 707/610 |

(Continued)

OTHER PUBLICATIONS

Krishnan et al. "VARMAN: Multi-plane security framework for software defined networks," Computer Communications, 2019, vol. 148, pp. 215-239.

(Continued)

*Primary Examiner* — Benjamin A Kaplan
(74) *Attorney, Agent, or Firm* — Sheridan Ross P.C.

(57) ABSTRACT

A device receives a packet from a local network. The packet may be directed toward a cloud computing resource. The device determines that the packet is associated with a new packet flow. In response to determining that the packet is associated with the new packet flow, the device provides one or more packets from the new packet flow to a machine learning model for packet inspection. The device receives an output from the machine learning model and routes the new packet flow based on the output received from the machine learning model. The output indicates whether or not the new packet flow is associated with a network attack.

18 Claims, 6 Drawing Sheets

(56) References Cited

U.S. PATENT DOCUMENTS

2023/0269274 A1\* 8/2023 Kazato .................... H04L 63/20
726/1

OTHER PUBLICATIONS

Extended Search Report for European Patent Application No. 22212419.0, dated Apr. 28, 2023, 10 pages.

\* cited by examiner

AI-SUPPORTED NETWORK TELEMETRY USING DATA PROCESSING UNIT

FIELD OF TECHNOLOGY

The present disclosure relates to telemetry in data processing units (DPUs), network interface cards (NICs), and adapters, and in some examples, utilizing artificial intelligence (AI) techniques to perform monitoring operations associated with performance and flow statistics.

BACKGROUND

Some systems may support intrusion detection system (IDS) techniques associated with denial-of-service (DDOS) attacks. In some cases, such techniques may include inspecting incoming data traffic in relation to DDOS. Such inspection of data traffic may be resource intensive.

SUMMARY

The described techniques relate to improved methods, systems, devices, and apparatuses that support AI supported telemetry. Generally, the described techniques provide for AI supported telemetry that mitigates the impact of distributed DDOS on a network.

A method is provided that includes: receiving a packet from a local network. In some aspects, the packet is directed toward a cloud computing resource; determining that the packet is associated with a new packet flow; in response to determining that the packet is associated with the new packet flow, providing one or more packets from the new packet flow to a machine learning model for packet inspection; receiving an output from the machine learning model; and routing the new packet flow based on the output received from the machine learning model. In some aspects, the output indicates whether or not the new packet flow is associated with a network attack.

A machine-readable medium is provided having data stored thereon, which if executed by one or more processors, cause the one or more processors to: inspect a packet directed toward a cloud computing resource; determine whether the packet is part of a packet flow associated with a network attack; and notify a DPU that the packet flow is not associated with the network attack thereby enabling the DPU to process additional packets in the packet flow via an offload path that operates at full wire speed.

A system is provided that includes: a DPU positioned between a cloud computing resource and a local network infrastructure. In some aspects, the DPU is configured to receive a packet from the local network infrastructure that is directed toward the cloud computing resource. The system includes a machine learning model configured to inspect the packet and determine whether the packet is part of a packet flow associated with a network attack. In some aspects, the machine learning model is further configured to notify the DPU that the packet flow is not associated with the network attack thereby enabling the DPU to process additional packets in the packet flow via an offload path that bypasses the machine learning model.

Examples may include one of the following features, or any combination thereof

In some examples of the method, system, and machine-readable medium described herein, the machine learning model is executed by a layer 7 (L7) processor.

In some examples of the method, system, and machine-readable medium described herein, the L7 processor may include at least one of a GPU, a DPU, and a Central Processing Unit (CPU).

In some examples of the method, system, and machine-readable medium described herein, the packet may include a first packet in the new packet flow.

In some examples of the method, system, and machine-readable medium described herein, the one or more packets are encrypted, where the machine learning model performs the packet inspection without decrypting the one or more packets.

Some examples of the method, system, and machine-readable medium described herein may include providing the packet to filtering logic that implements an attack-detection rule set. In some aspects, the attack-detection rule set is configured to determine that the packet is associated with the new packet flow.

In some examples of the method, system, and machine-readable medium described herein, the filtering logic is implemented at a lower layer of a protocol stack than the machine learning model.

In some examples of the method, system, and machine-readable medium described herein, the filtering logic is executed in at least one of a data link layer, a network layer, and a transport layer. In some aspects, the machine learning model is executed in an application layer.

In some examples of the method, system, and machine-readable medium described herein, routing the new packet flow may include directing all packets associated with the new packet flow to the cloud computing resource via an offload path.

In some examples of the method, system, and machine-readable medium described herein, the offload path carries the packets associated with the new packet flow at full wire speed.

Some examples of the method, system, and machine-readable medium described herein may include evaluating a header of the packet to determine an encryption and/or decryption need associated with the packet.

In some examples of the method, system, and machine-readable medium described herein, the packet is received at a DPU provided on a NIC.

In some examples of the method, system, and machine-readable medium described herein, determining that the packet is associated with the new packet flow may include determining that the packet is received from a tenant that has not previously transmitted a packet toward the cloud computing resource.

In some examples of the method, system, and machine-readable medium described herein, the cloud computing resource is shared among a plurality of tenants. In some aspects, the network attack may include at least one of a DDoS attack, a cryptominer attack, a broken access control, a security misconfiguration, an injection, a phishing attack, a malware attack, a ransomware attack, a cross-site scripting (XSS) attack, a sensitive data exposure, an information leakage, a cryptojacking, a fraudulent e-mail transmission, a botnet, a malicious insider attack, and a social profile engineering attack.

In some examples of the system described herein, the machine learning model is executed by a GPU operating at an application layer.

In some examples of the system described herein, the offload path carries the additional packets associated with the new packet flow at full wire speed.

In some examples of the system described herein, the packet is provided to the machine learning model in response to determining that the packet is received from a tenant that has not previously transmitted a packet toward the cloud computing resource.

In some examples of the system described herein, the DPU operates at one or more of a data link layer, a network layer, and a transport layer. In some aspects, the machine learning model is executed in an application layer.

DETAILED DESCRIPTION

Figure 1:
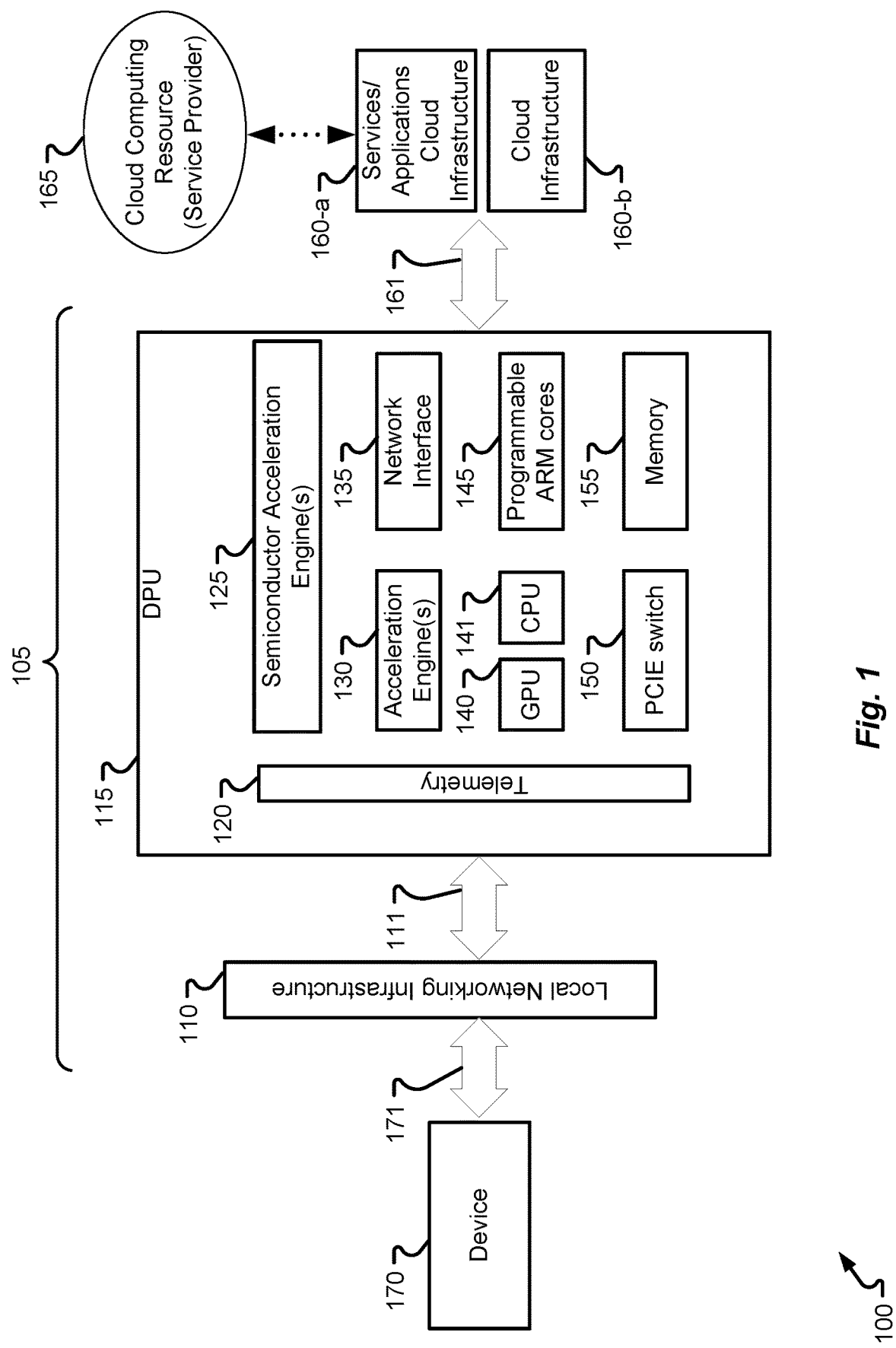
FIG. 1 illustrates an example of a system that supports AI-supported network telemetry using a DPU in accordance with aspects of the present disclosure.

The ensuing description provides example aspects of the present disclosure, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims. Various aspects of the present disclosure will be described herein with reference to drawings that are schematic illustrations of idealized configurations.

Some organizations (e.g., enterprises) may provide digital services (e.g., cloud-based applications, cloud services, etc.) via a digital infrastructure. In some cases, relatively small to medium sized organizations (e.g., small and medium enterprises (SMEs)) may not have ownership of the digital infrastructure. In some other cases, if an organization does own such a digital infrastructure, the organization may be unable to provide effective security protection for the same.

For example, poor planning, budgeting, and/or deployment with respect to cyber security may leave the organization and/or digital infrastructure open to various cyber risks (e.g., DDoS attacks, cryptominer attacks, a broken access control, a security misconfiguration, an injection, a phishing attack, a malware attack, a ransomware attack, a XSS attack, sensitive data exposure, information leakage, crypto jacking, a fraudulent e-mail transmission, a botnet, a malicious insider attack, a social profile engineering attack, etc.). Accordingly, for example, providing increased digital freedom, security, privacy, and awareness with respect to such cyber risks may mitigate potential losses in business that might otherwise result. In some cases, smaller organizations (e.g., SMEs) having less effective cyber security solutions compared to a large enterprise may be more likely to be targeted in a cyber-attack.

Aspects of the present disclosure include techniques that support providing cybersecurity solutions for various systems (e.g., corporate systems), networks, and sensitive information. The techniques described herein may support the protection of organizations from malicious online activity, for example, regardless of industry type, organization size, and/or business size. In some examples, the techniques described herein may be applied to small organizations (e.g., SMEs) for which resources that can be allocated to security solutions are limited. Aspects of the present disclosure may support the provision of cybersecurity solutions described herein to such small organizations, in accompany with appropriate recommendation services. In some aspects, the techniques described herein may support relatively easier adoption and usage (compared to other security techniques) for small organizations and/or vendors with limited level of expertise in cybersecurity management.

Aspects of the present disclosure include examples of specifying and implementing services for supporting network security management over a networking infrastructure (e.g., a small office networking infrastructure). Example services (e.g., cybersecurity management virtual network functions (VNFs), network services (NSs), etc.) are described that are deployable (e.g., relatively easily compared to some other network security techniques) over a programmable networking infrastructure. Non-limiting examples of the services (e.g., VNFs, NSs, etc.) may include network/web firewalls, IDSs, intrusion prevention systems (IPSs), security information and event management (STEM) systems, honeypots, etc. Some example aspects include implementing software defined networking (SDN) and network function virtualization (NFV) techniques for the design and development of software-based flow management solutions and network services, taking advantage of continuously evolving implementations of such functions.

In some cases, aspects of the present disclosure support onboarding of such solutions in the marketplace, where repositories of the services (e.g., cybersecurity management services, VNFs, NSs, etc.) may be made available for deployment over an office infrastructure (e.g., a small office networking infrastructure). In some aspects, the services may include edge network security management services.

Example aspects of the present disclosure support telemetry techniques which support, in addition to device performance analysis and flow statistics, security aspects (e.g., secure traffic), improved user experience, and latency reduction. In some cases, the techniques described herein may be applied to telecommunication (e.g., fourth generation (4G) telecommunication networks, fifth generation (5G) telecommunication networks, etc.) and IoT rich environments. In some aspects, the techniques described herein may be incorporated to provide non-enterprise SMEs with access to telemetry systems, which may ensure protection of data and operations associated with the SMEs.

For example, aspects of the present disclosure support telemetry in a DPU, in which the DPU is positioned between a cloud infrastructure and a local network infrastructure. The DPU may be standalone or included in a larger architecture. In some embodiments, the DPU may include a NIC (e.g., a SmartNIC), be included in a NIC, or include a NIC subsystem. An SME may make service requests to a cloud computing resource (also referred to herein as a service provider) included in the cloud infrastructure, via the local network infrastructure and the DPU. Machine learning models (also referred to herein as AI models) included in the DPU (and/or NIC) may analyze (e.g., be fed with) the service requests, determining whether or not the service requests are network attacks. In some aspects, the machine learning models may be implemented at a processor (e.g., a GPU, a CPU, etc.) of the DPU.

Accordingly, for example, a machine learning model(s) may be fed with live traffic (e.g., real-time packet flows), and the machine learning model(s) may determine whether any packets included in a packet flow are associated with a network attack (e.g., a DDoS attack, a cryptominer attack, etc.). In an example, if the machine learning model(s) determines that a packet associated with a new packet flow is associated with a network attack, the DPU may route (e.g., direct) all packets associated with the new packet flow to the cloud computing resource, via an offload path (also referred to herein as an offloaded path). Via the offload path, the routed packets may be carried at full wire speed (also referred to herein peak bitrate, connection speed, useful bit rate, information rate, or digital bandwidth capacity) to the cloud computing resource.

The techniques described herein may support improvements to detecting network attacks (e.g., DDoS attacks), such as a reduction in the number of instances in which incoming packets (or an incoming packet flow) are confused with a network attack. Other example advantages include a balanced early detection of network attacks (e.g., near 100% early detection or 100% early detection), increased service availability (e.g., near 100% service availability or 100% service availability), and improved scalability of networks through the utilization of DPUs (e.g., near 100% scalability or 100% scalability).

Aspects of the cloud infrastructure and local network infrastructure may be implemented by a programmable networking infrastructure, which includes telemetry. In some examples, the programmable networking infrastructure may be implemented through SDN and NFV techniques. In some aspects, the programmable networking infrastructure may support software-based flow management (e.g., management of packets associated with different packet flows).

Example aspects of the programmable networking infrastructure may be implemented within a market place environment where repositories of cybersecurity management VNFs and NSs are made available. In an example, a user network associated with the programmable networking infrastructure may support connecting services associated with on-site users to cloud computing resources (e.g., service providers).

The techniques described herein support intrusion detection capable of preventing service requests from being mistaken as network attacks (e.g., DDoS attacks) and/or reducing the amount of overall network attacks. Accordingly, for example, the techniques described herein may reduce the amount of latency associated with actual service requests by third parties. In some cases, the techniques may reduce the possibility of bottlenecks associated with processing and communicating the service requests. The techniques may support the establishment of an intrusion detection system that considering that new flows are being constantly established, their profiles differ one from another, and we need to maintain a reasonable network availability.

Aspects of the disclosure are further illustrated by and described with reference to apparatus diagrams, system diagrams, and flowcharts that relate to AI-supported network telemetry using a DPU.

FIG. 1 illustrates an example of system 100 that supports AI-supported network telemetry using a DPU in accordance with aspects of the present disclosure.

In an example, the system 100 may include a user network 105 (also referred to herein as an on-site user network, a local network, an office infrastructure, etc.) and cloud infrastructure(s) 160 (e.g., cloud infrastructure 160-a, cloud infrastructure 160-b, etc., also referred to herein as digital infrastructures). In an example, the cloud infrastructure 160-a may be referred to as a services/applications cloud infrastructure. In some aspects, via the user network 105 and the cloud infrastructure(s) 160, an organization (e.g., enterprise) may provide digital services (e.g., cloud-based applications, cloud services, etc.) to a user connecting to the user network 105. In some aspects, the digital services may include cybersecurity management services, VNFs, NSs, etc. as described herein. In some aspects, the digital services may be deployable over the user network 105.

The user network 105 may include a DPU 115 and a local networking infrastructure 110. In an example, the DPU 115 may be connected to the local networking infrastructure 110 via a communication channel 111 supported by the local networking infrastructure 110. In some aspects, the DPU 115 may be standalone or included in another device. For example, the DPU 115 may be (or included in) a NIC. In some aspects, the NIC may be a Smart NIC capable of supporting accelerated networking functions. A Smart NIC may also referred to herein as an intelligent server adapter (ISA).

In an example, the DPU 115 may support performance boosting through network data path processing. In some aspects, the DPU 115 may be a system on chip (SOC) device that combines a high-performance and software-programmable multi-core CPU, a high-performance network interface (e.g., network interface 135), and flexible and programmable acceleration engines (e.g., semiconductor acceleration engine(s) 125, acceleration engine(s) 130, etc.). The DPU 115, for example, provides a high-performance network interface capable of parsing, processing and efficiently transferring data at line rate, or the speed of a network.

The DPU 115 may include a telemetry component 120, acceleration engines (e.g., semiconductor acceleration engine(s) 125, acceleration engine(s) 130), a network interface 135, a GPU 140, a CPU 141, programmable processing cores 145, a PCI express (PCIe) switch 150, and memory 155.

The telemetry component 120 may support automated communication processes between the DPU 115 and multiple data sources (e.g., cloud computing resource 165, device 170, etc.). The telemetry component 120 may support monitoring of devices (e.g., cloud infrastructure(s) 160, cloud computing resources 165, device 170, etc.) and data in association with monitoring security, application health, quality, and performance. In some cases, the telemetry component 120 may support monitoring of network infrastructure, storage infrastructure, and overall bandwidth capacity and consumption. In some aspects, the telemetry component 120 may support cloud monitoring (e.g., with respect to metrics such as cloud availability, Internet latency, outages, etc.) and routing decisions (e.g., with respect to routing data over and between any of the local networking infrastructure 110, the DPU 115, the cloud infrastructure(s) 160, the cloud computing resource 165, the device 170, etc.).

The acceleration engines (e.g., semiconductor acceleration engine(s) 125, acceleration engine(s) 130) may include hardware components or electronic circuitry designed to perform functions with relatively higher efficiency compared to software programs executed on the CPU 141.

The network interface 135 may support the communication (e.g., transmission, reception) of packets between the DPU 115 and the device 170 (e.g., over communication channel 111 and the local networking infrastructure 110). In some aspects, the network interface 135 may support the communication of packets between the DPU 115 and the cloud computing resource 165 (e.g., over communication channel 161 and the cloud infrastructure(s) 160). In some aspects, the network interface 135 may be a network interface card (NIC).

The GPU 140 may support processing of computationally intensive workloads (e.g., artificial intelligence, deep learning, data science, etc.). For example, the GPU 140 may support aspects described herein of determining whether a packet (or corresponding packet flow) is associated with a network attack, determining attack-detection rule sets for detecting network attacks, etc. Additionally, or alternatively, the CPU 141 (and/or programmable cores 145) may implement aspects described herein with respect to determining whether a packet (or corresponding packet flow) is associated with a network attack, determining attack-detection rule sets for detecting network attacks, etc.

Although the programmable cores 145 are depicted as a particular type of programmable processing core, such as a programmable advanced reduced instruction set computer (RISC) machine (ARM) core, it should be appreciated that any suitable type of processing core or collection of processing cores may be included in the programmable cores 145. The programmable cores 145 may include multiple programmable processing cores of the same type or of different types. Furthermore, as the name suggests, the programmable processing cores may be configurable to perform different processing tasks without departing from the scope of the present disclosure.

The PCIe switch 150 may support switching between buses (e.g., PCIe buses) included in the DPU 115. The PCIe switch 150 may support packet based communications protocols and packet routing (e.g., based on memory address, I/O address, device ID, etc.). Additionally, or alternatively, the DPU 115 may include other switch types (e.g., PCI switches) for switching between buses included in the DPU 115.

The memory 155 may include memory local to the DPU 115. In some aspects, the memory 155 may store instructions and/or data local to the DPU 115. The memory 155 may include one or multiple computer memory devices. The memory 155 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 155, in some examples, may correspond to a computer-readable storage media. In some aspects, the memory 155 may be internal or external to the DPU 115.

Components of the DPU 115 such as, for example, the telemetry component 120, acceleration engines (e.g., semiconductor acceleration engine(s) 125, acceleration engine(s) 130), network interface 135, GPU 140, CPU 141, programmable cores 145, PCIe switch 150, and memory 155 may be interconnected by a system bus (not illustrated) of the DPU 115. The system bus may be, for example, a PCIe bus, a PCI bus, or the like. In some aspects, the system bus may include or be any high-speed system bus.

The cloud infrastructure(s) 160 (e.g., cloud infrastructure 160-*a*, cloud infrastructure 160-*b*, etc.) may be implemented by any combination of servers and/or databases (not illustrated). For example, the cloud infrastructure(s) 160 may provide cloud computing services (also referred to herein as digital services) such as infrastructure as a service (IaaS), platform as a service (Paas), software as a service (Saas), storage as a service (STaaS), security as a service (SECaaS), data as a service (Daas), desktop as a service (DaaS), test environment as a service (TEaaS), and application programming interface (API) as a service (APIaaS).

In an example, a user may connect to the user network 105 via a device 170 (also referred to herein as a client device) to access a cloud computing resource 165 providing a cloud computing service. For example, the device 170 may access the cloud computing service from the cloud computing resource 165, via the user network 105 and the cloud infrastructure(s) 160.

Aspects of the DPU 115, the cloud infrastructure(s) 160, the cloud computing resource 165, and the device 170 described herein may be implemented by any electronic devices capable of connecting to a wireless or wired network. In some cases, the system 100 may include any number of devices (e.g., DPU 115, cloud computing resource 165, device 170, etc.) and/or servers (e.g., implementing one or more cloud computing resources 165), and each of the devices and/or servers may be associated with a respective entity.

For example, the system 100 may support the communication of data packets between the cloud computing resource 165 and the device 170, for example, via the user network 105 (e.g., using the local networking infrastructure 110, the communication channel 111, and the DPU 115), a communication channel 161, and a communication channel 171. In some example aspects, with respect to providing data packets directed to the cloud computing resource 165, the data packets may flow through the communication channel 171, the local networking infrastructure 110, the communication channel 111, the telemetry component 120, the acceleration engine(s) 130, the network interface 135, the communication channel 161, and the cloud infrastructure(s) 160.

The user network 105 (e.g., the local networking infrastructure 110, the communication channel 111), the communication channel 161, and the communication channel 171 may be implemented by any communications network capable of facilitating machine-to-machine communications between entities (e.g., any number of DPUs 115, cloud computing resources 165, devices 170, etc.). For example, the communications networks may include any type of known communication medium or collection of communication media and may use any type of protocols to transport messages, signals, and/or data between endpoints. In some aspects, the communication networks may include wired communications technologies, wireless communications technologies, or any combination thereof. In some examples, the communications networks may support non-secure communication channels and secure communication channels.

In some examples, the communication channel 111 and communication channel 161 may be secure communication channels, and the communication channel 171 may be a non-secure communication channel. Additionally, or alternatively, the communication channel 111, communication channel 161, and communication channel 171 may include any combination of secure communication channels and non-secure communication channels.

The Internet is an example of a network (e.g., a communications network implementing aspects of any of the local networking infrastructure 110, the communication channel 111, the communication channel 161, and the communication channel 171) supported by the system 100, and the network may constitute an Internet Protocol (IP) network consisting of multiple computers, computing networks, and other devices (e.g., DPU 115, cloud computing resource 165, device 170, etc.) located in multiple locations. Other examples of networks supported by the system 100 may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VoIP) network, a cellular network, and any other type of packet-switched or circuit-switched network known in the art. In some cases, the system 100 may include of any combination of networks or network types. In some aspects, the networks may include any combination of communication mediums such as coaxial cable, copper cable/wire, fiber-optic cable, or antennas for communicating data (e.g., transmitting/receiving data).

The system 100 may support intrusion detection. For example, the system 100 may support high bandwidth traffic analysis with respect to changing network patterns. According to example aspects of the present disclosure, the DPU 115 may support high speed packet processing (e.g., line rate), including layer 2 (L2) up to layer 4 (L4) header parsing and manipulation. In some aspects, the DPU 115 may implement a filtering logic for DDoS logic based on this information. For example, the DPU 115 may implement filtering logic for determining a network attack (e.g., DDoS attack, a cryptominer attack, etc.).

Figure 2A:
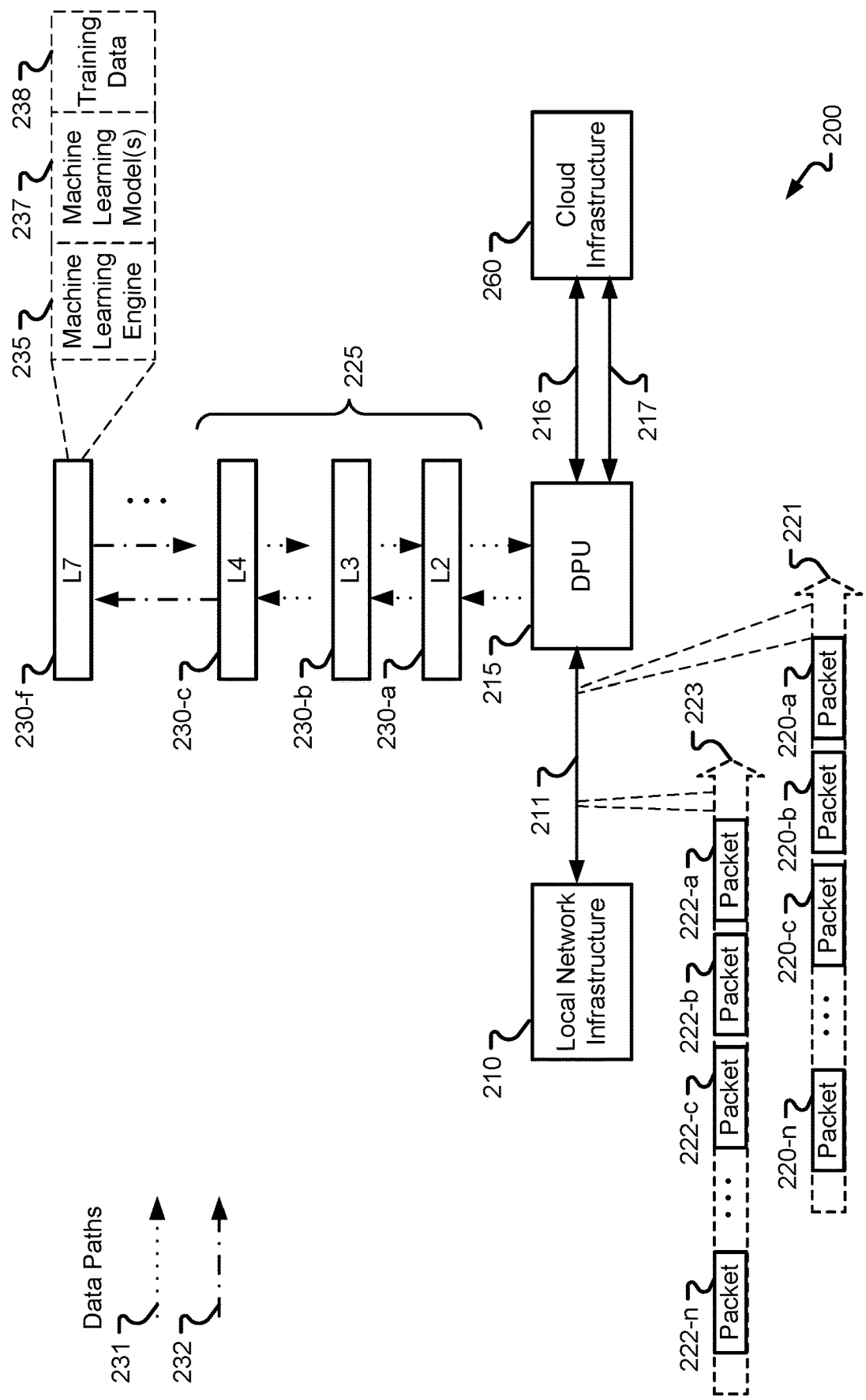
FIGS. 2A through 2C illustrate examples of a system that supports AI-supported network telemetry using a DPU in accordance with aspects of the present disclosure.
Figure 2B:
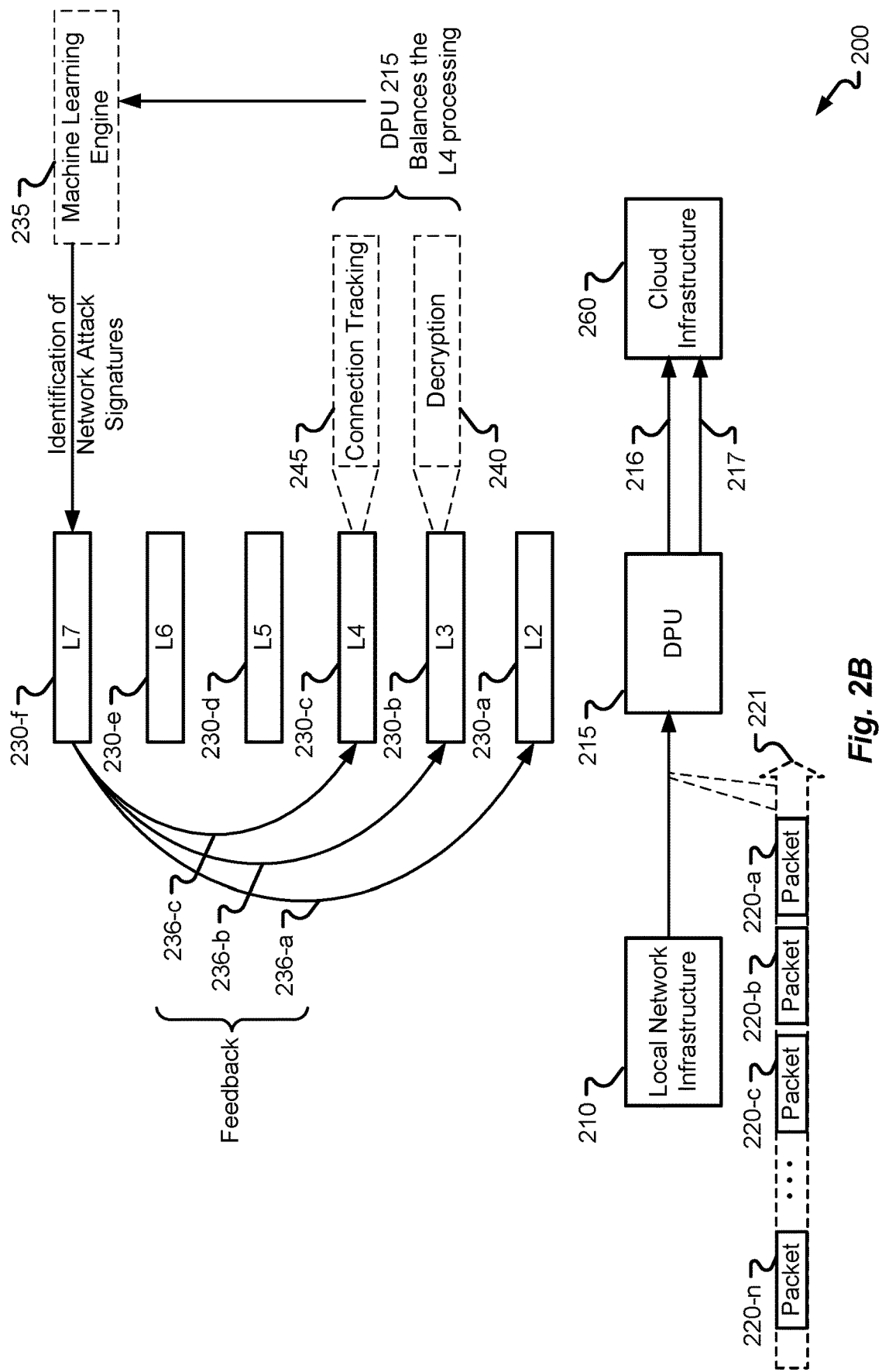
Figure 2C:
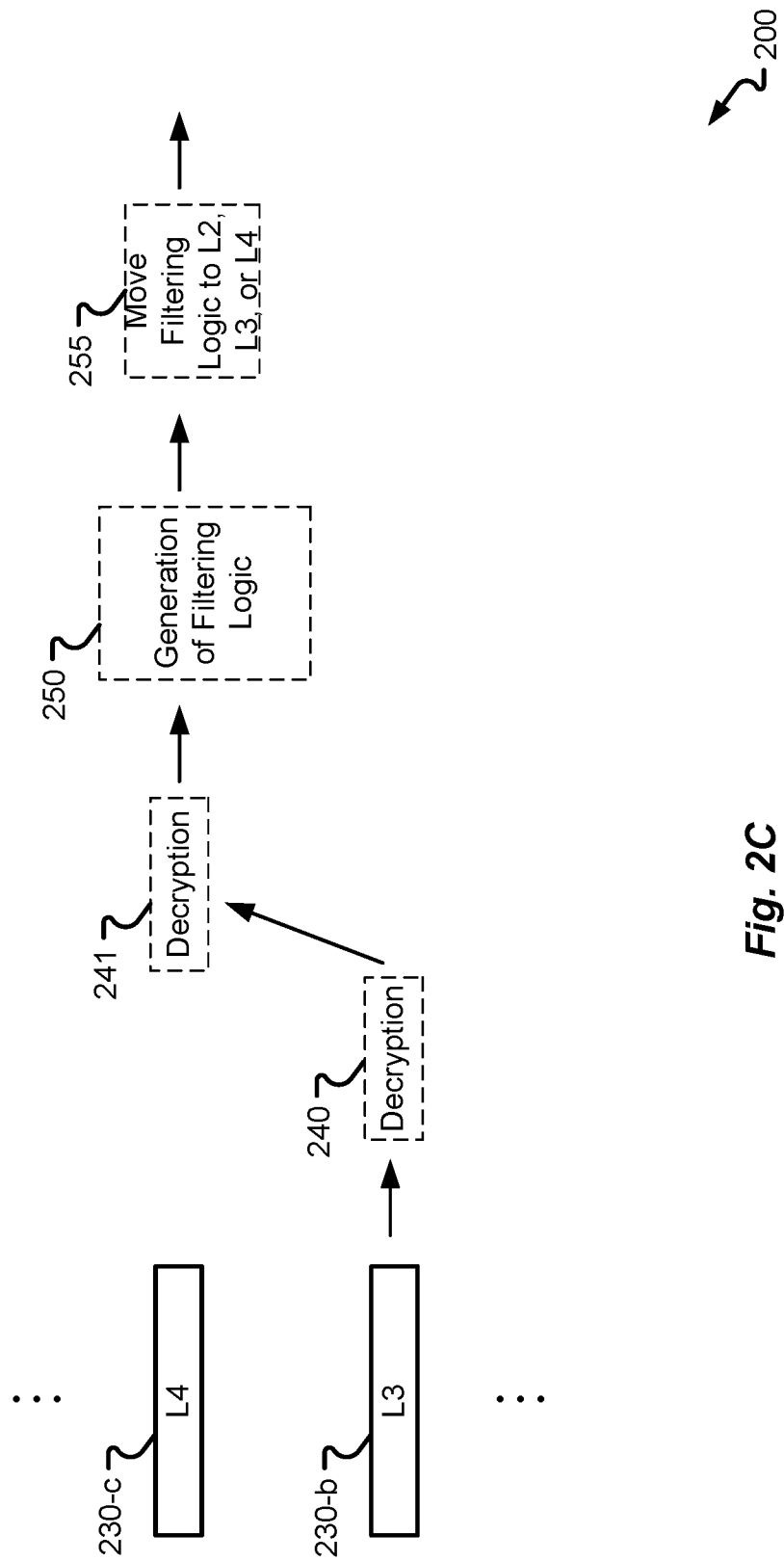

FIGS. 2A through 2C illustrate examples of a system 200 that supports AI-supported network telemetry using a DPU in accordance with aspects of the present disclosure. Aspects of the system 200 described herein may support layer header parsing and manipulation, filtering logic for packet inspection, and a machine learning model for packet inspection.

The system 200 may include aspects of the system 100 described with reference to FIG. 1. For example, FIGS. 2A and 2B illustrate a local network infrastructure 210, a DPU 215, and a cloud infrastructure 260. The local network infrastructure 210, the DPU 215, and the cloud infrastructure 260 may include aspects of like elements described herein with reference to FIG. 1. FIG. 2C illustrates aspects described herein that may be implemented by the DPU 215.

The system 200 may support the exchange of data between the local network infrastructure 210 and the DPU 215 via the communication path 211. The communication path 211 may include aspects of the communication channel 111 described with reference to FIG. 1.

The system 200 may support the exchange of data between the DPU 215 and the cloud infrastructure 260 via a communication path 216 and an offload path 217. For example, the system 200 may support the exchange of data between the DPU 215 and a cloud computing resource (e.g., a cloud computing resource 165 described with reference to FIG. 1) via the communication path 216, the offload path 217, and the cloud infrastructure 260. The communication path 216 and the offload path 217 may include aspects of the communication channel 161 described with reference to FIG. 1.

The DPU 215 (or a NIC including the DPU 215) may support a layered architecture of communication protocol stacks. For example, the DPU 215 may support a protocol stack including layers 230.

Layer 230-a (e.g., L2) is a data link layer supportive of lower level addressing structures used between end systems (e.g., connected nodes). For example, the layer 230-a (e.g., L2) may support node-to-node data transfer between connected nodes, where data is packaged into frames. The layer 230-a (e.g., L2) may be a lowermost layer of the protocol stack.

Layer 230-b (e.g., layer 3 (L3)) is a network layer responsible for receiving frames from the layer 230-a (e.g., L2) (data link layer), and delivering the frames to intended destinations based on addresses included inside the frames.

Layer 230-c (e.g., L4) is a transport layer supportive of managing the delivery and error checking of data packets (e.g., packets 220, packets 222, etc.). Layer 230-c (e.g., L4) may support regulating the size, sequencing, and transfer of data.

Layer 230-d (e.g., layer 5 (L5), later illustrated at FIG. 2B) is a session layer that supports establishment, management, and termination of sessions or connections between end devices (e.g., a device 170 and a cloud computing resource 165 described with reference to FIG. 1). In some aspects, the layer 230-d (e.g., L5) may support session layer services such as authentication and reconnections.

Layer 230-e (e.g., layer 6 (L6), later illustrated at FIG. 2B) is a presentation layer that supports translating between data formats, for example, based on syntax and/or semantics accepted by an application implemented at layer 230-f (e.g., L7). In some aspects, the layer 230-e (e.g., L6) may perform data encryption and decryption.

Layer 230-f (e.g., L7) is an application layer supportive of implementing end-user applications (e.g., a browser application, an email application, an office application, etc.). In some cases, the layer 230-f (e.g., L7) may be an uppermost layer of the protocol stack.

A machine learning engine 235 and a machine learning model 237 may be implemented at the layer 230-f (e.g., L7). The machine learning engine 235 and the machine learning model 237 may be executed by a processor (e.g., a L7 processor) at the layer 230-f (e.g., L7). In some aspects, the processor (e.g., L7 processor) may be included in the DPU 215 or separate from the DPU 215 (e.g., standalone). In some aspects, the L7 processor may include a GPU (e.g., GPU 140 described with reference to FIG. 1) integrated in the DPU 215 or a GPU separate from the DPU 215 (e.g., a standalone GPU). In some other examples, the L7 processor may include a CPU (e.g., CPU 141 described with reference to FIG. 1).

For example, a processor (e.g., GPU 140, CPU 141, etc.) of the DPU 215 may utilize data stored in a memory of the DPU 115 (e.g., memory 155 described with reference to FIG. 1) as a neural network. A neural network may also be referred to herein as a machine learning network. The neural network may include a machine learning architecture. In some aspects, the neural network may be or include an artificial neural network (ANN). In some other aspects, the neural network may be or include any machine learning network such as, for example, a deep learning network, a convolutional neural network, or the like. Some elements stored in the memory may be described as or referred to as instructions or instruction sets, and some functions of the DPU 215 may be implemented using machine learning techniques.

The memory (e.g., memory 155) may be configured to store instruction sets, neural networks, and other data structures (e.g., depicted herein) in addition to temporarily storing data for the processor (e.g., GPU 140, the CPU 141, etc.) to execute various types of routines or functions. For example, the memory may be configured to store program instructions (instruction sets) that are executable by the processor (e.g., GPU 140, the CPU 141, etc.) and provide functionality of the machine learning engine 235 described herein. The memory may also be configured to store data or information that is useable or capable of being called by the instructions stored in the memory. One example of data that may be stored in the memory for use by components thereof is a machine learning model(s) 237 (also referred to herein as a data model or a neural network model) and/or training data 238 (also referred to herein as a training data and feedback).

The machine learning engine 235 may include a single or multiple engines. The DPU 215 (e.g., using the machine learning engine 235) may utilize one or more machine learning models 237 for recognizing and processing information obtained from other devices (e.g., device 170 described with reference to FIG. 1, a server, a database, etc.). In some aspects, the DPU 215 (e.g., the machine learning engine 235) may update one or more machine learning models 237 based on learned information included in the training data 238. In some aspects, the machine learning engine 235 and the machine learning models 237 may support forward learning based on the training data 238. The machine learning engine 235 may have access to and use one or more machine learning models 237.

The machine learning model(s) 237 may be built and updated by the machine learning engine 235 based on the training data 238. The machine learning model(s) 237 may be provided in any number of formats or forms. Non-limiting examples of the machine learning model(s) 237 include Decision Trees, Support Vector Machines (SVMs), Nearest Neighbor, and/or Bayesian classifiers. In some aspects, the machine learning model(s) 237 may include a predictive model such as an autoregressive model. Other example aspects of the machine learning model(s) 237, such as generating (e.g., building, training) and applying the machine learning model(s) 237, are described with reference to the figure descriptions herein.

In some aspects, the training data 238 may include any combination of patterns (e.g., data patterns, signatures, network attack signatures) and/or metadata associated with detecting whether a packet (e.g., a packet 220 described herein) or a packet flow (e.g., a packet flow 221 or a packet flow 223 described herein) is associated with a network attack. Additional example aspects of the training data 238 are later described herein.

With reference to FIG. 2A, the system 200 may support L2 and L4 parsing and manipulation of packets 220 (e.g., any of packet 220-*a* through packet 220-*n*). In some aspects, the system 200 may support the determination of whether a packet 220 (e.g., packet 220-*a*, packet 220-*b*, etc.) is considered part of a network attack (e.g., a DDoS attack, a cryptominer attack, etc.) or not. If a packet 220 is considered part of network attack, the system 200 may establish a digital filter. In some examples, the digital filter may be established first at a lower layer in the protocol stack (e.g., layer 230-*a* (e.g., L2)), and then at a higher layer in the protocol stack (e.g., layer 230-*c* (e.g., (L4)).

In an example, the DPU 215 may receive a packet 220-*a* from the local network infrastructure 210. The packet 220-*a* may be, for example, a first packet of a packet flow 221 that includes packet 220-*a* through packet 220-*n*. In an example, the DPU 215 may determine that the packet 220-*a* is directed toward a cloud computing resource (e.g., a cloud computing resource 165 described with reference to FIG. 1) associated with the cloud infrastructure 260. In some aspects, the determination may be based on an address indicated with the packet 220-*a*.

The DPU 215 may determine whether the packet 220-*a* is associated with a new packet flow. For example, the DPU 215 may determine the packet 220-*a* is associated with a new connection between a communication device (e.g., of a device 170 described with reference to FIG. 1) and a cloud computing resource associated with the cloud infrastructure 260. In an example, the DPU 215 may determine that the packet 220-*a* is associated with a new packet flow (e.g., determine that the packet flow 221 is a new packet flow) if the DPU 215 determines that the packet 220-*a* is from a tenant that has not previously transmitted a packet toward the cloud computing resource.

In an example of determining whether the packet 220-*a* is associated with a new packet flow (e.g., determining that the packet flow 221 is a new packet flow), the DPU 215 may provide the packet 220-*a* to filtering logic 225. In some aspects, the filtering logic 225 may be implemented at an acceleration engine of the DPU 215 (e.g., acceleration engine 130 described with reference to FIG. 1). In some cases, the filtering logic 225 may be implemented by a configurable hardware machine within the DPU 215, and the configurable hardware machine may be capable of "steering" a packet or packet flow described herein. In an example, the configurable hardware machine is a full wire speed machine supportive of performing such filtering, without packet loss.

The filtering logic 225 may implement a rule set(s) configured to determine whether the packet 220-*a* is associated with a new packet flow. In some aspects, the filtering logic 225 may include an attack-detection rule set(s) for detecting network attacks (e.g., a DDoS attacks). In an example, the rule set(s) for determining whether the packet 220-*a* is associated with the packet flow 221 and/or the attack-detection rule set(s) for detecting network attacks may include pre-configured rule sets.

The filtering logic 225 may be implemented at layer 230-*a* (e.g., L2), layer 230-*b* (e.g., L3), and layer 230-*c* (e.g., L4). In another example, the filtering logic 225 may be implemented at any combination of layer 230-*a* (e.g., L2), layer 230-*b* (e.g., L3), and layer 230-*c* (e.g., L4). Accordingly, for example, when a packet 220 (e.g., packet 220-*a*, packet 220-*b*, etc.) arrives at the DPU 215, the packet 220 may traverse layer 230-*a* (e.g., L2) through layer 230-*c* (e.g., L4).

In some aspects, any combination of layer 230-*a* (e.g., L2) through layer 230-*c* (e.g., L4) may include rule set(s) configured to determine whether a packet 220 (e.g., packet 220-*a*) is associated with a new packet flow and attack-detection rule sets for detecting whether the packet 220 is associated with a network attack (e.g., a DDoS attack, a cryptominer attack, etc.). For example, the rule set(s) configured to determine whether a packet 220 (e.g., packet 220-*a*) is associated with a new packet flow may be implemented at any of layer 230-*a* (e.g., L2) through layer 230-*c* (e.g., L4). In another example, the attack-detection rule set(s) may be implemented at any of layer 230-*a* (e.g., L2) through layer 230-*c* (e.g., L4).

The DPU 215 may identify whether the packet flow 221 (e.g., if identified as a new packet flow) fits any of the attack-detection rule sets associated with layer 230-*a* through layer 230-*c*. For example, the DPU 215 may compare a pattern (e.g., a data pattern, a signature, a network attack signature, etc.) of the packet flow 221 to patterns of packet flows included in the attack-detection rule sets. The attack-detection rule sets may include patterns (e.g., data patterns, signatures) corresponding to non-malicious packet flows and patterns corresponding to malicious packet flows (e.g., network attacks, DDoS attacks, etc.). In some aspects, the signatures may include DDoS signatures, DDoS attack signatures, cryptominer attack signatures, or the like.

In an example, based on the comparison, the DPU 215 may determine that the pattern of the packet flow 221 matches a pattern associated with a non-malicious packet flow. Accordingly, for example, the DPU 215 may direct all packets 220 associated with the packet flow 221 to the cloud computing resource via the offload path 217 (e.g., transmit all data packets 220 to the cloud computing resource at full wire speed). The offload path 217 may support offloads in hardware (e.g., at the DPU 215). In some aspects, offloading a packet 220 (or packets 220) may be referred to herein as an offload mode.

In some alternative aspects, the DPU 215 may direct some of the packets 220 associated with the packet flow 221 to the cloud computing resource via the communication path 216, and the DPU 215 may direct the remainder of the packets 220 to the cloud computing resource via the offload path 217. For example, the DPU 215 may direct packet 220-*a* to the cloud computing resource via the communication path 216 (e.g., transmit packet 220-*a* to the cloud computing resource at a speed less than full wire speed), and the DPU 215 may direct packet 220-*b* through packet 220-*n* to the cloud computing resource via the offload path 217 (e.g., transmit packet 220-*b* through packet 220-*n* to the cloud computing resource at full wire speed).

In another example, based on the comparison, the DPU 215 may determine that the pattern of the packet flow 221 matches a pattern associated with a malicious packet flow (e.g., a network attack, a DDoS attack, etc.). Accordingly, for example, the DPU 215 may refrain from directing the packets 220 associated with the packet flow 221 (e.g., refrain from transmitting the data packets 220) to the cloud computing resource entirely.

In some cases, based on the comparison, the DPU 215 may determine that the pattern of the packet flow 221 does not match the pattern of any packet flow included in the attack-detection rule sets. For example, the DPU 215 may determine that the pattern of the packet flow 221 does not match a pattern associated with a non-malicious packet flow included in the attack-detection rule set, and the DPU 115 may determine that the pattern of the packet flow 221 does not match a pattern associated with a malicious packet flow (e.g., a network attack, a DDoS attack, etc.) included in the attack-detection rule set. That is, for example, the DPU 215 may identify that the packet flow 221 does not fit any of the attack-detection rule sets associated with layer 230-*a* through layer 230-*c*.

Accordingly, for example, the DPU 215 may forward one or more of the packets 220 (e.g., any or all of packet 220-*a* through packet 220-*n*) to layer 230-*f* (e.g., L7) for packet inspection. For example, the DPU 215 may provide one or more packets 220 from the packet flow 221 to the machine learning model 237 (implemented at layer 230-*f* (e.g., L7)) for packet inspection. Using the machine learning model 237, the DPU 215 (e.g., the machine learning engine 235) may inspect a packet 220 (e.g., packet 220-*a*, packet 220-*b*, etc.) to determine whether the packet flow 221 (e.g., determined as a new packet flow) is associated with a network attack (e.g., DDoS attack, a cryptominer attack, etc.).

The DPU 215 (e.g., the machine learning engine 235, using the machine learning model 237) may provide enhanced L7-based detection of network attacks (e.g., a DDoS attack, a cryptominer attack, etc.) using a rules database associated with detecting network attacks. For example, using the rules database, the DPU 215 (e.g., the machine learning engine 235, using the machine learning model 240) may identify whether the packet flow 221 is associated with a network attack. In some cases, the DPU 215 (e.g., the machine learning engine 235) may extract a pattern corresponding to the packet flow 221.

In some aspects, the rules database may include application layer related rules for feature extraction corresponding to the layer 230-*f* (e.g., L7). For example, the application layer related rules may include rules for L7 feature extraction.

In some aspects, the extracted pattern may include features (e.g., a signature) indicative of whether the packet flow 221 is malicious (e.g., associated with a network attack) or not. The extracted pattern may include, for example, an indication of whether the packet flow 221 is a new packet flow for which to extract associated properties. In an example, the extracted pattern may include features such as source (e.g., device 170, etc.), destination (e.g., cloud computing resource 165, etc.), application identifier, etc. Examples of the extracted patterns are provided herein in the cases in which the DPU 215 (e.g., the machine learning engine 235) determines that the packet flow 221 is malicious or non-malicious.

In a first example, the DPU 215 (e.g., the machine learning engine 235) may identify that the packet flow 221 is associated with a network attack (e.g., DDoS attack, a cryptominer attack, etc.), and the DPU 215 (e.g., the machine learning engine 235) may extract a pattern corresponding to the packet flow 221. In some aspects, the pattern may include features indicating that the packet flow 221 is associated with a network attack. For example, the pattern may include a signature (e.g., a DDoS signature, a DDoS attack signature, a cryptominer attack signature, etc.) indicating that the packet flow 221 is associated with a network attack. Accordingly, for example, the DPU 215 (e.g., the machine learning engine 235) may identify whether the packet flow 221 includes a network attack signature (e.g., a DDoS signature, a DDoS attack signature, a cryptominer attack signature, etc.) to determine whether the packet flow 221 is a network attack. An example of the machine learning engine 235 identifying network attack signatures at the layer 230-*f* (e.g., L7) is illustrated at FIG. 2B.

In a second example, the DPU 215 (e.g., the machine learning engine 235) may identify that the packet flow 221 is not associated with a network attack (e.g., DDoS attack, a cryptominer attack, etc.), and the DPU 215 (e.g., the machine learning engine 235) may extract a pattern corresponding to the packet flow 221. In some aspects, the pattern may include features indicating that the packet flow 221 is not associated with a network attack. For example, the pattern may include a signature indicating that the packet flow 221 is not associated with a network attack.

The DPU 215 (e.g., the machine learning engine 235) may forward extracted patterns (e.g., signatures) to layer 230-*a* (e.g., L2) through layer 230-*c* (e.g., L4). In an example, the DPU 215 may add the extracted patterns (e.g., signatures) to the existing filters and attack-detection rule sets implemented at the filtering logic 225, thereby updating (e.g., increasing) the total number of attack-detection rule set(s) implemented at the filtering logic 225. An example of forwarding the extracted patterns (e.g., signatures) to layer 230-*a* (e.g., L2) through layer 230-*c* (e.g., L4) is illustrated at feedback 236 (e.g., feedback 236-*a*, feedback 236-*b*, feedback 236-*c*) of FIG. 2B.

In some aspects, the DPU 215 (e.g., the machine learning engine 235) may generate and provide additional filtering logic to the filtering logic 225. For example, the DPU 215 (e.g., the machine learning engine 235) may provide the additional filtering logic to any of layer 230-*a* (e.g., L2) through layer 230-*c* (e.g., L4). In some cases, the filtering logic may include extracted patterns, extracted network attack signatures, and/or generated attack-detection rule sets as determined by the machine learning engine 235 for blocking incoming packets (e.g., packets associated with a network attack). An example of the DPU 215 using the machine learning engine 235 (e.g., at layer 230-*f* (e.g., L7)) for generating and providing the filtering logic to the filtering logic 225 (e.g., any of layer 230-*a* (e.g., L2) through layer 230-*c* (e.g., L4)) is illustrated at FIG. 2C.

Accordingly, if the DPU 215 receives packets associated with a subsequent new packet flow (e.g., different from packet flow 221), the DPU 215 may utilize the updated number of attack-detection rule set(s) to determine whether a pattern of the subsequent new packet flow matches a pattern associated with a malicious packet flow (e.g., a pattern corresponding to the packet flow 221 of the first example) or a non-malicious packet flow (e.g., a pattern corresponding to the packet flow 221 of the second example).

In an example, the DPU 215 may receive a subsequent packet 222-*a* from the local network infrastructure 210. The packet 222-*a* may be, for example, a first packet of a packet flow 223 that includes packet 222-*a* through packet 222-*n*. In an example, the DPU 215 may determine that the packet 222-*a* is directed toward a cloud computing resource of the cloud infrastructure 260.

The DPU 215 may determine whether the packet 222-*a* is associated with a new packet flow. In an example, the DPU 215 may determine that the packet flow 223 is a new packet flow. In response to determining the packet flow 223 is a new packet flow, the DPU 215 may provide the packet 222-*a* to filtering logic 225.

Example aspects are described herein with respect to the first example above, in which the packet flow 221 has been identified as being associated with a network attack (e.g., DDoS attack, a cryptominer attack, etc.). If the DPU 215 determines that the pattern of the packet flow 223 matches the pattern associated with the packet flow 221, the DPU 215 may also consider the packet flow 223 to be malicious (e.g., a network attack). For example, using layer 230-*a* (e.g., L2) through layer 230-*c* (e.g., L4), the DPU 215 may determine that the pattern of the packet flow 223 matches the pattern of the packet flow 221 as included in the updated attack-detection rule set. That is, for example, the DPU 215 may determine that the features (e.g., pattern, network attack signature) of the packet flow 223 match the features (e.g., pattern, network attack signature) of the packet flow 221. Accordingly, for example, the DPU 215 may refrain from directing the packets 222 associated with the packet flow 223 (e.g., refrain from transmitting the packets 222) to the cloud computing resource entirely.

Alternative example aspects are described herein with respect to the second example above, in which the packet flow 221 has been identified as not being associated with a network attack. If the DPU 215 determines that the pattern of the packet flow 223 matches the pattern associated with the packet flow 221, the DPU 215 may consider the packet flow 223 to be non-malicious. For example, using layer 230-*a* (e.g., L2) through layer 230-*c* (e.g., L4), the DPU 215 may determine that the pattern (e.g., features, signature) of the packet flow 223 match the pattern (e.g., features signature) of the packet flow 221 as included in the updated attack-detection rule set. Accordingly, for example, the DPU 215 may direct the packets 222 (e.g., packet 222-*a* through packet 222-*n*, or alternatively, packet 222-*b* through packet 222-*n*) associated with the packet flow 223 to the cloud computing resource, via the offload path 217.

Accordingly, for example, the system 200 may support processing packets of an unknown packet flow (e.g., a packet flow having a corresponding pattern that is not included in the attack-detection rule set) using the data path 231, a data path 232, and communication path 216 (as illustrated in FIG. 2A). The system 200 may support processing packets of a known packet flow (e.g., a packet flow having a corresponding pattern included in the attack-detection rule set) using a data path 231 in combination with communication path 216 and offload path 217 (as illustrated in FIG. 2A).

With reference to FIG. 2B and FIG. 2C, aspects of the system 200 that support packet inspection with respect to encryption, decryption, and connection tracking are described herein.

Each packet 220 (e.g., packet 220-*a*, packet 220-*b*, etc.) may include a header. The header may indicate addresses of a source and destination of the packet 220 and fields associated with routing the packet 220.

In an example, a packet 220 (e.g., packet 220-*a*) may include a header indicating a protocol associated with delivery of the packet 220. For example, the header may be an L3 header indicating an L3 protocol associated with delivery of the packet 220. In another example, the header may be an L4 header indicating an L4 protocol associated with delivery of the packet 220.

In some aspects, a packet 220 may be an encrypted packet. In some other aspects, a packet 220 may be an unencrypted packet. In some aspects, a header (e.g., L3 header, L4 header, etc.) of the packet 220 may include an indication of an encryption and/or decryption need associated with the packet 220. The DPU 215 may evaluate the header (e.g., L3 header, L4 header) to determine the encryption and/or decryption need associated with the packet 220. An example of header evaluation may include evaluating a 5-tuple including a source IP address (e.g., in an IP header), a destination IP address (e.g., in the IP header), source port ("sport") (e.g., in a TCP header), destination port ("dport") (e.g., in the TCP header), and a subsequent protocol (e.g., communication protocol, data transfer protocol, etc.). Example aspects below are described with reference to a packet 220 which is an encrypted packet.

In an example, if the header is an L3 header, the DPU 215 may handle decryption of the packet 220 at layer 230-*b* (e.g., L3), as illustrated at decryption 240 at FIGS. 2B and 2C. In another example, if the header is an L4 header, the DPU 215 may handle decryption of the packet 220 at layer 230-*c* (e.g., L4), as illustrated at decryption 241 at FIG. 2C. Additionally, or alternatively, the DPU 215 may implement packet encryption at layer 230-*b* (e.g., L3) and/or at layer 230-*c* (e.g., L4).

In some aspects, if the header is an L4 header, the DPU 215 may implement connection tracking offload at layer 230-*c* (e.g., L4), as illustrated at connection tracking 245 at FIG. 2B. Connection tracking refers to the ability to maintain state information about a connection in memory tables, such as source and destination IP address and port number pairs (known as socket pairs), protocol types, connection state and timeouts. In an example, connection tracking offload may include tracking connections and storing information about the state of the connections. For example, at connection tracking 245, the DPU 215 (or a NIC including the DPU 215) may implement connection tracking offload, such that traffic (e.g., packet 220 and the packet flow 221) of established connections is routed by the DPU 215 to a cloud computing resource of the cloud infrastructure 260, via the offload path 217 illustrated at FIG. 2A.

The system 200 may support process balancing. For example, the DPU 215 may balance the L4 processing (e.g., connection tracking, decryption, etc.) implemented at the layer 230-*c* (e.g., L4). In an example, the DPU 215 may direct (e.g., send) a percentage or all of network traffic from the layer 230-*c* (e.g., L4) to the machine learning engine 235 for processing. In some aspects, the machine learning engine 235 may be a dedicated pattern machine engine implemented at the layer 230-*f* (e.g., L7) capable of handling pre-defined network attack signatures (e.g., DDoS signatures, etc.) and inspecting the incoming data (e.g., the directed network traffic). For example, the machine learning engine 235 may detect for network attacks included in the incoming data by determining whether a pattern (e.g., signature) corresponding to any of the incoming data matches a pre-defined network attack signature (e.g., DDoS signature, etc.).

At 250 illustrated in FIG. 2C, the DPU 215 (e.g., machine learning engine 235) may generate a filtering logic (e.g., for blocking incoming packets associated with a network attack) as described herein. At 255, the DPU 215 (e.g., machine learning engine 235) may provide or move the generated filtering logic to the filtering logic 225. In an example, the DPU 215 may provide or move the filtering logic to any of layer 230-*a* (e.g., L2) through layer 230-*c* (e.g., L4)). The filtering logic may include example aspects of the filtering logic 225 and the attack-detection rule sets described herein.

In some alternative and/or additional aspects, for the example in which a packet 220 is an encrypted packet, the DPU 215 (e.g., machine learning engine 235, using the machine learning model 240) may perform packet inspection without decrypting the packet 220. For example, the DPU 215 may extract metadata from the packet 220, without decrypting the packet 220. In an example, the DPU 215 (e.g., machine learning engine 235) may provide the extracted metadata to the machine learning model 240. The DPU 215 (e.g., using the machine learning model 240) may analyze the extracted metadata to determine whether the packet 220 (and the associated packet flow 221) is associated with a network attack (e.g., a DDoS attack, a cryptominer attack, etc.).

Examples of meta data that may be extracted by the DPU 215 from an encrypted packet (e.g., packet 220) include: packet size, number of packets in a session (e.g., a session between end devices such as a device 170 and a cloud computing resource 165 described with reference to FIG. 1), and a plain header. In some aspects, portions of the meta data (e.g., packet size, number of packets, and plain header, etc.) are not encrypted. In an example, in TLS encrypted traffic, the media access control (MAC) header, virtual local area network (VLAN) header, IP header, and TCP header are in plain text and may be extracted by the DPU 215. In some aspects, DPU 215 may add the extracted metadata to the training data 238. In an example, the machine learning model 240 may be further trained using the extracted metadata.

Accordingly, as described with reference to FIG. 2A through FIG. 2C, the system 200 may support continuous feedback and actualization amongst the layers 230. For example, the system 200 may support continuous feedback and actualization amongst layer 230-*a* (e.g., L2), layer 230-*b* (e.g., L3), layer 230-*c* (e.g., L4), and layer 230-*f* (e.g., L7)).

Once the data was inspected, and decision was taken, the DPU 215 will be able to deliver the results to the business logic app for further analysis. In an example, a role of the DPU 215 may include gathering information regarding the application running in the layer 230-*f* (e.g., L7) of a given session. For example, the DPU 215 may implement an inspection operation that includes determining what is the application in the layer 230-*f* (e.g., L7). Based on completion or finalization of the information gathering and/or inspection by the DPU 215, the DPU 215 may deliver the associated results (e.g., an application identifier associated with the application) to security software to run and/or provide its telemetry service. In an example, the DPU 215 may provide the telemetry service using telemetry component 120 described with reference to FIG. 1.

Aspects of the system 200 described herein may support reduced processing overhead compared to some systems. For example, in some intrusion detection systems, each individual packet is inspected in relation to a network attack (e.g., DDoS attack, cryptominer attack, etc.). However, inspecting each individual packet may be resource intensive. Additionally, such techniques may not be effective for cases in which a network attack (e.g., a DDoS attack, etc.) is designed to circumvent a packet-by-packet approach.

According to example aspects of the present disclosure described herein, the system 200 (e.g., DPU 215) may inspect a packet of a new packet flow (e.g., packet 220-*a* of packet flow 221), while handling all other packets (e.g., packet 220-*b* through packet 220-*n*) of the same packet flow at full wire speed via the offload path 217. Accordingly, for example, the system 200 (e.g., DPU 215) may inspect a relatively small percentage of traffic (e.g., about 10% of traffic) compared to some other intrusion detection systems, which may reduce processing overhead and provide improved data throughput.

Figure 3:
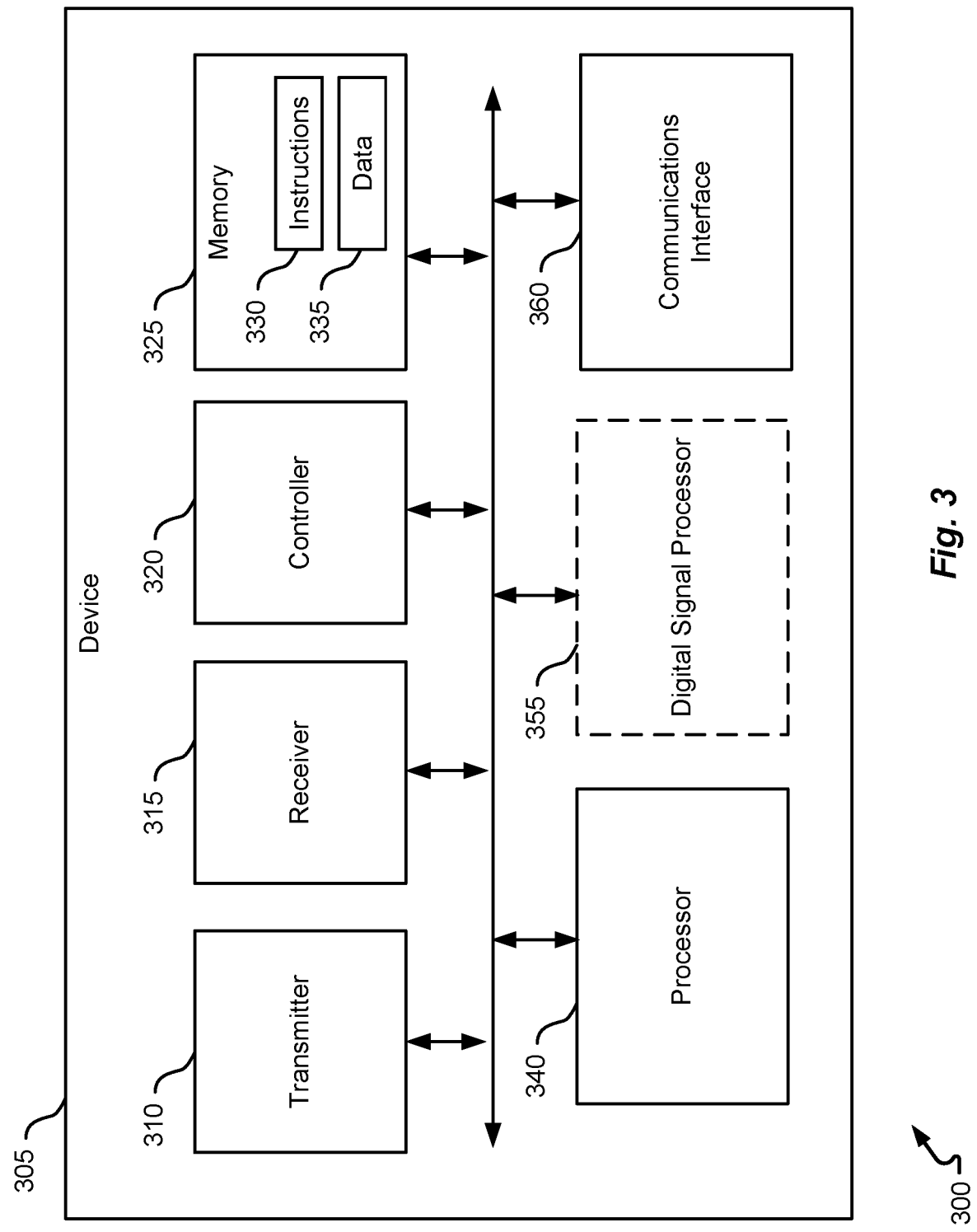
FIG. 3 illustrates an example of a system that supports AI-supported network telemetry using a DPU in accordance with aspects of the present disclosure.

FIG. 3 illustrates an example of a system that supports AI-supported network telemetry using a DPU in accordance with aspects of the present disclosure. The system 300 may include a device 305. The device 305 may implement aspects of the DPU 115, the cloud computing resource 165, the device 170, or the DPU 215 described with reference to FIGS. 1 and 2. In some cases, the device 305 may be referred to as a computing resource. The device 305 may perform any or all of the operations described in the present disclosure.

The device 305 may include a transmitter 310, a receiver 315, a communications interface 320, a controller 320, a memory 325, a processor 340, and a communications interface 360. In some examples, components of the device 305 (e.g., transmitter 310, receiver 315, controller 320, memory 325, processor 340, communications interface 360, etc.) may communicate over a system bus (e.g., control busses, address busses, data busses, PCI bus, PCIe bus, etc.) included in the device 305.

The transmitter 310 and the receiver 315 may support the transmission and reception of signals to and from the device 305. In some aspects, the transmitter 310 and the receiver 315 may support the transmission and reception of signals within the device 305. The transmitter 310 and receiver 315 may be collectively referred to as a transceiver. An antenna may be electrically coupled to the transceiver. The device 305 may also include (not shown) multiple transmitters 310, multiple receivers 315, multiple transceivers and/or multiple antennas.

The controller 320 may be located on a same chip (e.g., ASIC chip) as the transmitter 310 and/or the receiver 315. In some cases, the controller 320 may be located on a different chip as the transmitter 310 and/or the receiver 315. In some examples, the controller 320 may be located on a chip of or on a chip of another device 305. The controller 320 may instruct the transmitter 310 to use one or more algorithms for encoding and/or decoding data. In some examples, the controller 320 may be a programmed microprocessor or microcontroller. In some aspects, the controller 320 may include one or more CPUs, memory, and programmable I/O peripherals.

The memory 325 may be any electronic component capable of storing electronic information. The memory 325 may be, for example, RAM, ROM, magnetic disk storage media, optical storage media, flash memory devices in RAM, on-board memory included with the processor, EPROM memory, EEPROM memory, registers, and so forth, including combinations thereof.

The memory 325 may include instructions 330 (computer readable code) and data 335 stored thereon. The instructions 330 may be executable by the processor 340 to implement the methods disclosed herein. In some aspects, execution of the instructions 330 may involve one or more portions of the data 350. In some examples, when the processor 340 executes the instructions 330, various portions of the instructions 330 and/or the data 335 may be loaded onto the processor 340.

The processor 340 may correspond to one or multiple computer processing devices. For example, the processor 340 may include a silicon chip, such as a Field Programmable Gate Array (FPGA), an ASIC, any other type of Integrated Circuit (IC) chip, a collection of IC chips, or the like. In some aspects, the processors may include a microprocessor, a CPU (e.g., CPU 141 described with reference to FIG. 1), a GPU (e.g., GPU 140 described with reference to FIG. 1), or plurality of microprocessors configured to execute instructions sets stored in a corresponding memory (e.g., memory 325 of the device 305). For example, upon executing the instruction sets stored in memory 325, the processor 340 may enable or perform one or more functions of the device 305. In some examples, a combination of processors 340 such as an ARM (e.g., programmable cores 145 described with reference to FIG. 1) and a digital signal processor (DSP) 355 may be implemented in the device 305.

The communications interface 360 may support interactions (e.g., via a physical or virtual interface) between a user and the device 305.

Figure 4:
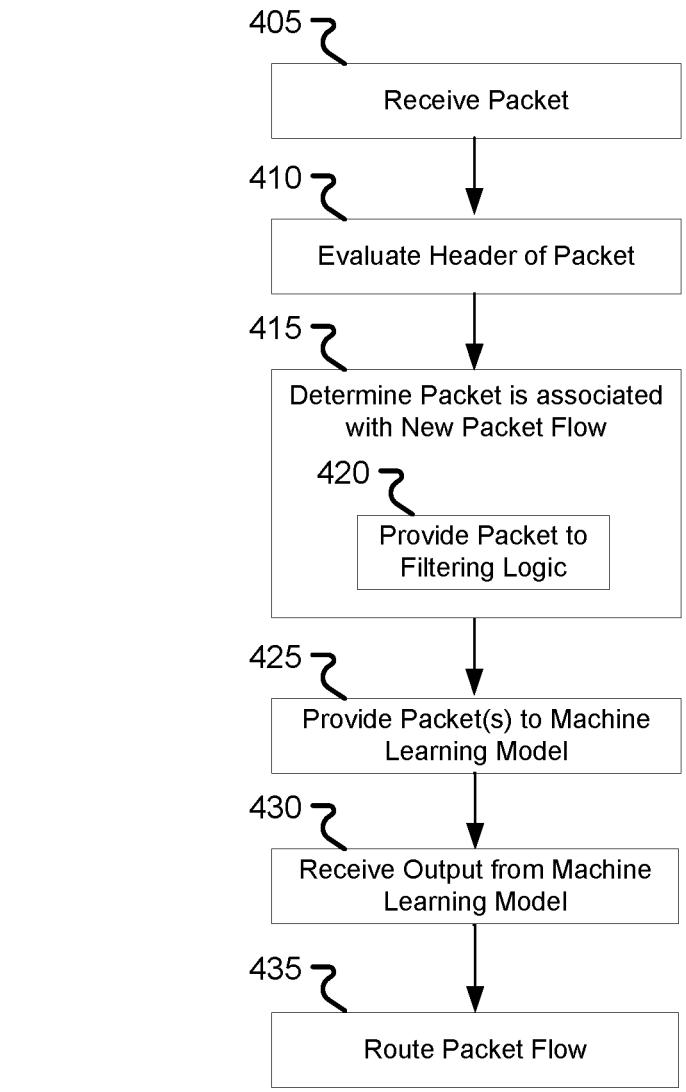
FIG. 4 illustrates an example of a process flow that supports AI-supported network telemetry using a DPU in accordance with aspects of the present disclosure.

FIG. 4 illustrates an example of a process flow 400 that supports AI-supported network telemetry using a DPU in accordance with aspects of the present disclosure. In some examples, process flow 400 may implement aspects of a DPU 115, a DPU 215, or a device 305 described with reference to FIGS. 1 through 3.

In the following description of the process flow 400, the operations may be performed in a different order than the order shown, or the operations may be performed in different orders or at different times. Certain operations may also be left out of the process flow 400, or other operations may be added to the process flow 400.

It is to be understood that while a DPU 115 is described as performing a number of the operations of process flow 400, any device (e.g., GPU 140 of the DPU 115, CPU 141 of the DPU 115, another DPU, a NIC including a different DPU, etc.) may perform the operations shown. In some aspects, the DPU 115 is provided on a NIC.

At 405, the DPU 115 may receive a packet from a local network. In some aspects, the packet is directed toward a cloud computing resource. In some aspects, the cloud computing resource is shared among a plurality of tenants.

At 410, the DPU 115 may evaluate a header of the packet to determine an encryption and/or decryption need associated with the packet.

At 415, the DPU 115 may determine that the packet is associated with a new packet flow. In some aspects, the packet may include a first packet in the new packet flow. In some aspects, determining that the packet is associated with the new packet flow may include determining that the packet is received from a tenant that has not previously transmitted a packet toward the cloud computing resource.

In an example, at 420, the DPU 115 may provide the packet to filtering logic that implements an attack-detection rule set. In some aspects, the attack-detection rule set is configured to determine that the packet is associated with the new packet flow.

At 425, in response to determining that the packet is associated with the new packet flow, the DPU 115 may provide one or more packets from the new packet flow to a machine learning model for packet inspection. In some aspects, the machine learning model may be executed by a L7 processor. In some aspects, the L7 processor may include at least one of a GPU, DPU 115, and a CPU.

In some aspects, the filtering logic (e.g., described with reference to 420) may be implemented at a lower layer of a protocol stack than the machine learning model. For example, the filtering logic may be executed in at least one of a data link layer, a network layer, and a transport layer. In an example, the machine learning model may be executed in an application layer.

In some aspects, the one or more packets are encrypted. In some aspects (not illustrated), the machine learning model may perform the packet inspection described with reference to 425, without decrypting the one or more packets.

At 430, the DPU 115 may receive an output from the machine learning model. In some aspects, the output indicates whether or not the new packet flow is associated with a network attack. In some aspects, the network attack may include at least one of a DDoS attack, a cryptominer attack, a broken access control, a security misconfiguration, an injection, a phishing attack, a malware attack, a ransomware attack, a XSS attack, a sensitive data exposure, an information leakage, a cryptojacking, a fraudulent e-mail transmission, a botnet, a malicious insider attack, and a social profile engineering attack.

At 435, the DPU 115 may route the new packet flow based on the output received from the machine learning model. In some aspects, routing the new packet flow may include directing all packets associated with the new packet flow to the cloud computing resource via an offload path. In an example, the offload path carries the packets associated with the new packet flow at full wire speed.

Any of the steps, functions, and operations discussed herein can be performed continuously and automatically.

The exemplary apparatuses, systems, and methods of this disclosure have been described in relation to examples of a DPU 105, a DPU 215, and device 305. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

Other variations are within spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one example, different components of a computer system have separate processors and different processors execute different subsets of instructions.

Accordingly, in at least one example, computer systems are configured to implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising:
   receiving a packet from a local network, wherein the packet is directed toward a cloud computing resource;
   determining that the packet is associated with a new packet flow;
   in response to determining that the packet is associated with the new packet flow, providing one or more packets from the new packet flow to a machine learning model for packet inspection;
   providing the packet to filtering logic that implements an attack-detection rule set, wherein the filtering logic is executed in at least one of a data link layer, a network layer, and a transport layer;
   receiving an output from the machine learning model, wherein the output indicates whether or not the new packet flow is associated with a network attack, and wherein the machine learning model is executed in an application layer; and
   routing the new packet flow based on the output received from the machine learning model.

2. The method of claim 1, wherein the machine learning model is executed by a layer 7 (L7) processor.

3. The method of claim 2, wherein the L7 processor comprises at least one of a Graphics Processing Unit (GPU), a Data Processing Unit (DPU), and a Central Processing Unit (CPU).

4. The method of claim 1, wherein the packet comprises a first packet in the new packet flow.

5. The method of claim 1, wherein the one or more packets are encrypted, and wherein the machine learning model performs the packet inspection without decrypting the one or more packets.

6. The method of claim 1,
   wherein the attack-detection rule set is configured to determine that the packet is associated with the new packet flow.

7. The method of claim 1, wherein routing the new packet flow comprises directing all packets associated with the new packet flow to the cloud computing resource via an offload path.

8. The method of claim 7, wherein the offload path carries the packets associated with the new packet flow at full wire speed.

9. The method of claim 1, further comprising:
evaluating a header of the packet to determine an encryption and/or decryption need associated with the packet.

10. The method of claim 1, wherein the packet is received at a Data Processing Unit (DPU) provided on a Network Interface Card (NIC).

11. The method of claim 1, wherein determining that the packet is associated with the new packet flow comprises determining that the packet is received from a tenant that has not previously transmitted a packet toward the cloud computing resource.

12. The method of claim 1, wherein the cloud computing resource is shared among a plurality of tenants, and wherein the network attack comprises at least one of a Distributed Denial of Service (DDOS) attack, a cryptominer attack, a broken access control, a security misconfiguration, an injection, a phishing attack, a malware attack, a ransomware attack, a cross-site scripting (XSS) attack, a sensitive data exposure, an information leakage, a cryptojacking, a fraudulent e-mail transmission, a botnet, a malicious insider attack, and a social profile engineering attack.

13. A system, comprising:
a Data Processing Unit (DPU) positioned between a cloud computing resource and a local network infrastructure, wherein the DPU is configured to receive a packet from the local network infrastructure that is directed toward the cloud computing resource; and
a machine learning model configured to inspect the packet and determine whether the packet is part of a packet flow associated with a network attack, wherein the machine learning model is further configured to notify the DPU that the packet flow is not associated with the network attack thereby enabling the DPU to process additional packets in the packet flow via an offload path that bypasses the machine learning model, and wherein the packet is provided to the machine learning model in response to determining that the packet is received from a tenant that has not previously transmitted a packet toward the cloud computing resource, wherein the packet is provided to multiple layers of a protocol stack of the DPU, and wherein two or more layers of the multiple layers of the protocol stack implement filtering logic to determine that the packet flow is either associated with the network attack or not associated with the network attack.

14. The system of claim 13, wherein the machine learning model is executed by a Graphics Processing Unit (GPU) operating at an application layer.

15. The system of claim 13, wherein the offload path carries the additional packets at full wire speed.

16. The system of claim 13, wherein the cloud computing resource is shared among a plurality of tenants, and wherein the network attack comprises at least one of a Distributed Denial of Service (DDOS) attack, a cryptominer attack, a broken access control, a security misconfiguration, an injection, a phishing attack, a malware attack, a ransomware attack, a cross-site scripting (XSS) attack, a sensitive data exposure, an information leakage, a cryptojacking, a fraudulent e-mail transmission, a botnet, a malicious insider attack, and a social profile engineering attack.

17. A non-transitory machine-readable medium having data stored thereon, which if executed by one or more processors, cause the one or more processors to:
inspect a packet directed toward a cloud computing resource;
determine whether the packet is part of a packet flow associated with a network attack; and
notify a Data Processing Unit (DPU) that the packet flow is not associated with the network attack thereby enabling the DPU to process additional packets in the packet flow via an offload path that operates at full wire speed, wherein determining whether the packet is part of the packet flow associated with the network attack includes:
providing the packet to multiple layers of a protocol stack of the DPU, wherein two or more layers of the multiple layers of the protocol stack implement filtering logic to determine that the packet flow is either associated with the network attack or not associated with the network attack.

18. The non-transitory machine-readable medium of claim 17, wherein each of the two or more layers comprises an associated filtering logic that compares one or more patterns of the packet with one or more patterns defined by a respective attack detection rule set to determine that the packet flow is either associated with the network attack or not associated with the network attack.

* * * * *